(12) United States Patent
Jablonski et al.

(10) Patent No.: US 7,278,093 B2
(45) Date of Patent: *Oct. 2, 2007

(54) CUSTOM COMPUTER WALLPAPER AND MARKETING SYSTEM AND METHOD

(75) Inventors: Tomas E. Jablonski, Pine, CO (US); Richard A. Schmelzer, Boulder, CO (US); Robert A. Schmelzer, Boulder, CO (US)

(73) Assignee: Modya, Inc., Lafayette, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/130,915

(22) Filed: May 17, 2005

(65) Prior Publication Data

US 2005/0209923 A1 Sep. 22, 2005

Related U.S. Application Data

(62) Division of application No. 09/510,500, filed on Feb. 22, 2000, now Pat. No. 6,920,606.

(60) Provisional application No. 60/121,049, filed on Feb. 22, 1999.

(51) Int. Cl.
*G06F 13/00* (2006.01)
(52) U.S. Cl. .................. 715/501.1; 715/526; 715/517; 345/619; 345/629
(58) Field of Classification Search ............ 715/501.1, 715/500.1, 526, 517; 707/3; 345/619, 629
See application file for complete search history.

(56) References Cited

U.S. PATENT DOCUMENTS

| | | |
|---|---|---|
| 4,992,940 A | 2/1991 | Dworkin |
| 5,305,195 A | 4/1994 | Murphy |
| 5,319,542 A | 6/1994 | King, Jr. et al. |
| 5,424,770 A | 6/1995 | Schmelzer et al. |
| 5,440,479 A | 8/1995 | Hutton |

(Continued)

OTHER PUBLICATIONS

WallMaster Pro V2.5, Jan. 18, 1999, tropicalware.com, pp. 1 of 7, ☐☐http://web.archive.org/web/19990128075251/www.tropicalwares.com/wallpro.html.*

*Primary Examiner*—Stephen Hong
*Assistant Examiner*—Matthew Ludwig
(74) *Attorney, Agent, or Firm*—Cooley Godward Kronish LLP (57) ABSTRACT

An interactive system and method is disclosed for providing wallpaper or screen saver images for display on the background of a personal computer visual display. Wallpaper (or screen saver) images may be conveniently located by a consumer and downloaded from a wallpaper web site for use on the desktop of the consumer's personal computer. A clickable icon is incorporated into the wallpaper image or overlaid on the wallpaper image. When the icon is clicked on using a mouse, or otherwise activated by the consumer, the consumer's personal computer is automatically connected to a predetermined location on the Internet. Furthermore, sponsors may market their goods or services to consumers by paying a fee to have their clickable icons or advertisements incorporated into or overlaid on the wallpaper images. By clicking on the clickable icons or advertisements, the consumer is automatically connected to the sponsor's web site. In addition, a number of web sites may be affiliated with the wallpaper site, and consumers who subscribe to the wallpaper site may be able to conveniently purchase products or services from these affiliated sites by merely clicking on one or more pop-up buttons, or the like, after necessary consumer information has been given to the wallpaper web site.

5 Claims, 5 Drawing Sheets

U.S. PATENT DOCUMENTS

| | | |
|---|---|---|
| 5,499,046 A | 3/1996 | Schiller et al. |
| 5,594,490 A | 1/1997 | Dawson et al. |
| 5,619,639 A | 4/1997 | Mast |
| 5,664,111 A | 9/1997 | Nahan et al. |
| 5,680,535 A | 10/1997 | Harbin et al. |
| 5,696,905 A | 12/1997 | Reimer et al. |
| 5,740,549 A | 4/1998 | Reilly et al. |
| 5,748,190 A | 5/1998 | Kjorsvik |
| 5,761,649 A | 6/1998 | Hill |
| 5,781,894 A | 7/1998 | Petrecca et al. |
| 5,819,284 A | 10/1998 | Farber et al. |
| 5,867,161 A | 2/1999 | Walsh |
| 5,893,091 A | 4/1999 | Hunt et al. |
| 5,905,492 A * | 5/1999 | Straub et al. ............... 715/744 |
| 5,913,040 A | 6/1999 | Rakavy et al. |
| 5,948,061 A | 9/1999 | Merriman et al. |
| 5,960,411 A | 9/1999 | Hartman et al. |
| 5,978,648 A * | 11/1999 | George et al. .............. 434/362 |
| 6,061,695 A | 5/2000 | Slivka et al. |
| 6,084,583 A | 7/2000 | Gerszberg et al. |
| 6,088,696 A | 7/2000 | Moon et al. |
| 6,101,529 A * | 8/2000 | Chrabaszcz ................. 709/203 |
| 6,181,838 B1 | 1/2001 | Knowlton |
| 6,202,083 B1 | 3/2001 | Chrabaszcz |
| 6,400,367 B2 | 6/2002 | Kire |
| 6,456,307 B1 | 9/2002 | Bates et al. |
| 6,486,900 B1 | 11/2002 | Shen et al. |
| 6,546,400 B1 * | 4/2003 | Aberson ................... 707/104.1 |
| 6,587,837 B1 | 7/2003 | Spagna et al. |
| 7,043,526 B1 * | 5/2006 | Wolfe ......................... 709/203 |
| 7,168,034 B2 * | 1/2007 | Hennings et al. ........ 715/500.1 |

\* cited by examiner

CUSTOM COMPUTER WALLPAPER AND MARKETING SYSTEM AND METHOD

RELATED APPLICATION INFORMATION

This application is a division of U.S. application Ser. No. 09/510,500, filed Feb. 22, 2000 now U.S. Pat. No. 6,920,606, which claims the benefit of U.S. Provisional Application No. 60/121,049, filed Feb. 22, 1999, the disclosure of which is incorporated herein by reference.

BACKGROUND OF THE INVENTION

1. Field of the Invention

This invention is directed to an interactive system and method for obtaining and displaying images as wallpaper or screen saver images on the desktop of a personal computer or similar environment. The invention is also directed to an interactive marketing, sales, and purchasing system and method.

2. Description of the Prior Art

It is common for personal computers to include a provision for displaying a decorative image on the computer desktop. In a Windows®-based or MacIntosh®-based operating system, the desktop is the portion of the display that serves as a background. Decorative images that are displayed on the desktop are known as wallpaper, and the wallpaper image normally remains present in the background of the display during use of the computer. The various icons, task bars, and windows of the operating system or applications are displayed over this background. The placement of wallpaper images on the background serves to provide a decorative touch to the overall computer display, and gives the computer user the opportunity to personalize the desktop display of his or her computer. Wallpaper images are usually included as part of the computer's operating system, or are added later by the user with the addition of a designated wallpaper program or other software, or by downloading images from various sources on the Internet, such as web pages, commercial sites, or the like. Often wallpaper images are acquired based upon a particular user's personal interests or pursuits.

Similarly to wallpaper, screen savers may also incorporate images such as photographs, artwork or the like. Screen savers are programs that are generally set to become operative after a prescribed time period has passed since the most recent input to a personal computer by a user. The screen saver program activates based upon an assumption that the user is no longer using the computer. The purpose of the screen saver is to prevent ghost images from appearing on the cathode ray tube of the computer monitor as a result of having the same image displayed constantly over extended periods of time. By cycling through several alternative images or by introducing animated elements, or the like, screen savers prevent this "burn in" of a particular image. Thus, screen savers are popular, and as described above with respect to wallpaper, computer users often like to personalize their screen saver images by selecting pictures, artwork or other images that are they find personally pleasing.

Prior art wallpaper and screen saver programs are usually loaded onto a personal computer from a CD-Rom or floppy disk. For example, Second Nature Software, Inc., (www.secondnature.com) produces a wallpaper and screen saver program for Windows® and MacIntosh® systems which is entitled "Slideshow", and which is available on floppy disk. The wallpaper program includes a plurality of images based upon a particular theme or the work of a particular artist, and these images may be cycled through manually by the user, or on an automated basis by the program. The program also enables the user to download jpeg, bitmap, or other images using a separate web browser program, and incorporate these downloaded images into the image set to be displayed as wallpaper. A plurality of images may be stored as an image set or display set, and the program may be directed to cycle through the wallpaper images in the display set on a daily, hourly, or other basis. However, the user must manually seek out and download the additional images using a separate web browser program, and then manually add the new images to the image set for use in the wallpaper program.

SUMMARY OF THE INVENTION

In one aspect, the invention is a system which provides a simple and convenient method for a consumer to obtain image files for use as wallpaper or screen saver images on a personal computer ("PC") desktop, or similar environments, such as a Web TV® display, terminal display, or the like. While the invention will be primarily described in the environment of a wallpaper program and wallpaper images, it should be understood that the wallpaper program may include a screen saver subroutine, or may alternatively be a screen saver program. Further, it will be apparent to those skilled in the art that the images and clickable icons downloaded or otherwise used with or as part of the invention may be used as wallpaper or screen saver images, or both.

The system of the invention includes at least one consumer PC having a visual display and communication access to the Internet, although, it is envisioned that thousands or millions of consumers having consumer PC's may eventually use the invention in the manner described for the at least one consumer PC. A wallpaper desktop program for operating on the consumer's PC is downloaded to the consumer's PC, or otherwise loaded into a memory in the consumer's PC. The wallpaper desktop program includes an image management feature, and is capable of managing and displaying at least one wallpaper image on the visual display of the consumer's PC. There is further provided at least one wallpaper web site on a wallpaper web site server for providing access to at least one wallpaper image file stored on an image server in communication with the Internet. A main program is also included and is stored on an application server in communication with the Internet. The main program receives communications from the wallpaper web site and provides communications to the wallpaper web site. The application server may be the same server as the wallpaper web site server and the image server, or a different server in communication with the other servers through the Internet, a local network, or similar communication network.

The main program controls the overall wallpaper system, including downloading of wallpaper images to the consumer PC and the initial downloading of the wallpaper desktop program, if necessary, through the use of a download program or subroutine. The main program also keeps track of consumers who access the wallpaper web site, and can implant cookie files into the memory of the consumer's PC for monitoring the consumer's interests, web sites visited by the consumer, or the like. The main program also controls a consumer preference database which can store and monitor consumer information and consumer preferences on particular subjects, as provided by the consumer, or as derived from cookie files. The main program further oversees the storage and distribution of image files for use as wallpaper images, and maintains a wallpaper image database which is accessed by the consumer through the wallpaper web site for downloading particular images to the consumer's PC. The main program may also control an interactive marketing feature of the invention whereby sponsors who are interested in advertising to consumers have their company logo, advertisement, icon, multimedia presentation, or the like, downloaded with a wallpaper image file and displayed with the image on the consumer's desktop.

In using the system of the invention, the consumer accesses the wallpaper web site using his or her web browser, and identifies one or more desired wallpaper images. The images may be identified simply by selecting one or more available images displayed by the wallpaper web site, or a more elaborate search system may be in place. Under the search system option, the consumer enters a search criteria and the main program conducts a search of the image file database to locate images which meet the specified criteria. The web site then displays one or more images which have been identified as meeting the search criteria. Prior to downloading one or more selected image files to the consumer, the consumer may be required to fill out a consumer preference form at the wallpaper web site in which the consumer provides personal information about himself or herself which may be useful to marketers of goods or services (i.e., sponsors). When the requested information has been provided by the consumer, the wallpaper image file or files are downloaded to the consumer's PC along with the wallpaper desktop program which manages and displays the wallpaper images on the desktop of the consumer's PC.

New image files can be periodically added to the wallpaper web site image file database. The main application program may periodically check the image database for additional wallpaper images which are desirable to the consumer. The main program may select new images based upon the type of image files previously downloaded by the consumer, or may select the images based upon the specific search criteria designated by the consumer as being of interest. Also, the new images may be image files or advertisements for products which the consumer has expressed an interest in purchasing. When such new image files are identified by the main program, a notice may be delivered to the consumer. The notice tells the consumer that one or more new image files are available, and provides a URL (Uniform Resource Locator) link for the consumer to click on to access a location on the Internet where the new image(s) may be viewed. The consumer is then able to download the new image file or files, and add them to those already stored in memory for use as wallpaper on the consumer's PC. The notice may be delivered in a number of ways, including: (1) the notice may be e-mailed directly to the consumer; (2) the notice may be delivered to the consumer the next time the consumer accesses the Internet by loading a clickable button, icon, banner, or the like over the wallpaper on the consumer's desktop through the use of a cookie file; or, (3) if the consumer has a personalized "front page" associated with an Internet host, such as the Excite® or Yahoo® front page, a notice may be placed on the consumer's personalized front page.

In another aspect, the above-described wallpaper system may be utilized as part of an interactive marketing, sales, and purchasing tool. For example, one or more sponsors interested in advertising to consumers are identified to the wallpaper main program. The sponsor optionally specifies one or more particular desirable marketing traits, such as age, income, hobbies, geographical location, interests, etc. The consumer preference database containing the consumer's personal information which was supplied when selecting the wallpaper images is then searched to locate any consumers which match the desired traits. Or, similarly, when a consumer fills out the consumer preference form, the consumer may be identified as matching the particular sponsor's desired trait. Once a match is made, the sponsor's clickable icon, logo, advertisement, or the like, may be included with the wallpaper image files downloaded to the consumer.

The clickable icon is preferably an embedded or overlaid object file, such as an Active X control, Java Applet, or other suitable application. When the clickable icon is clicked-on using a mouse, or otherwise activated by the consumer, such as by using the computer keyboard, a signal is sent to the wallpaper desktop program which causes the program to connect the consumer's PC to a predetermined site on the Internet. The predetermined site is preferably a URL address associated with the clickable icon file. The clickable icon file may be downloaded along with the wallpaper image and overlaid on the image by the wallpaper desktop program present on the consumer's PC. Alternatively, the clickable icon may be embedded in the image prior to downloading. Still alternatively, the clickable icon file may be pre-loaded with the wallpaper desktop program. The clickable icon may be animated, and may flash, move, or otherwise be animated to attract attention of the user of the consumer's PC.

Once the wallpaper images are in place on the consumer's PC, as described above, the clickable icons are displayed either temporarily or permanently with the wallpaper images. The consumer may click on a clickable icon to access a predetermined location on the Internet, such as the sponsor's web site. The wallpaper desktop program automatically connects the consumer to the Internet, and goes directly to the sponsor's web site. Once this has occurred, the clickable icon may or may not continue to be displayed with the wallpaper image, and the sponsor may be sent a bill for the marketing service in accordance with the number of site visits resulting from the service. Alternatively, the sponsor may pay a predetermined fee set in accordance with receiving the service for a specified period of time, or the like. Thus, under a basic aspect, the invention is directed to a system whereby a wallpaper or screen saver image in displayed on the consumer's PC, and the image has a clickable icon located on a portion thereof, the icon cannot generally be removed by the consumer, and when clicked-on by the consumer, the icon activates a program which automatically connects the consumer PC to a web site associated with the icon, such as a sponsor's or advertiser's web site.

In an additional aspect, the invention may include a proactive shopping system wherein the consumer indicates that he or she is interested in purchasing a particular product. This information may be in response to a prompt, such a questionnaire or consumer preferences form, periodically displayed on the consumer's PC by the wallpaper desktop program or the cookie file. A shopping program, associated with the main program server or a subroutine of the main program, receives this information and seeks out the particular product on the Internet. Alternatively, an employee of the wallpaper service operator may receive the information and seek out suitable products on behalf of the consumer. The consumer may then be presented with a notice, as described above, which provides a URL link to the Internet site where the product may be purchased. Alternatively, the wallpaper main program may download an image or advertisement of the product to the consumer's PC, and the wallpaper desktop program will load that image onto the consumer's desktop as a wallpaper or screen saver image. The image may include a clickable icon, button, or other provision for enabling the consumer to purchase the product. Clicking the button either connects the consumer to a predetermined location on the Internet for purchasing the product, or otherwise causes the consumer's purchase information and desire to purchase the product to be transferred to the product supplier so that the product supplier may send the product to the consumer and charge the consumer for the product.

Under a related aspect of the invention, a number of web sites on the Internet may become affiliated with the wallpaper web site, the wallpaper main application server, and the wallpaper system operator. These sites may then become "one-click compatible" with consumers who subscribe to the wallpaper web site. Thus, consumers may purchase products or services from affiliated sites by merely clicking on one or more buttons at the affiliated sites. The consumer's mailing address, credit card information, and other necessary information is then automatically transferred to the affiliated site by the main program, without the necessity of the consumer filling out additional address forms, credit card numbers, or the like.

In yet another aspect, the system and method of the present invention can also be used to enable consumers to purchase a hard copy of a wallpaper/screen saver image, such as a poster, print, painting, or other product having the image thereon. As described above, the wallpaper desktop program is loaded into the memory on the consumer's PC either by the main program downloading the wallpaper desktop program to the consumer's PC over the Internet, or by pre-loading the wallpaper desktop program to the consumer's PC from a floppy disk, cd-rom, or the like, either before purchase, or subsequently. The wallpaper desktop program can display one or more wallpaper images on the visual display connected to the consumer's PC. The wallpaper desktop program can also notify the consumer that one or more wallpaper images may be obtained from the wallpaper web site. When the consumer accesses the wallpaper web site through the Internet, the wallpaper web site displays available wallpaper images. One or more wallpaper images are selected by the consumer at the wallpaper web site, as described above, and downloaded to the memory in the consumer's PC by the main program. The wallpaper desktop program receives the new images with its image-managing feature, and displays the wallpaper images on the consumer's visual display. At least one clickable icon file is downloaded with the wallpaper images, and the wallpaper desktop program also displays the clickable icon when the wallpaper image is displayed. When displayed, the clickable icon may include text which prompts the consumer to purchase a hard copy of the image. The clickable icon, when clicked-on by the consumer using a mouse, causes the wallpaper desktop program to activate the consumer's web browser program and modem dialer for connecting the consumer's PC to the consumer's Internet service provider. The wallpaper desktop program places a predetermined URL address associated with the clickable icon in the address bar of the web browser, and the web browser connects the consumer's PC to the web site at that URL. At the web site, the consumer is given the option of purchasing a print, poster, painting, or the like, of the wallpaper image. Optionally, if the consumer's purchase information is pre-registered, the consumers desire to purchase the image hard copy may be merely communicated to the web site rather than requiring the consumer to fill out a form at the web site. Also optionally, the purchase information may be stored in the consumer's PC and communicated the next time the consumer is on-line, rather than connecting the consumer immediately. A notification that the consumer's order has been placed may be communicated to consumer when the event has occurred.

Consequently, the present invention provides a convenient method for consumers to obtain desired wallpaper images according to their interests and personal taste. The present invention also provides a means for consumers to conveniently purchase posters, prints, or the like, of desirable images. The present invention further provides a method for sponsors desiring a desktop presence to reach consumers having specific traits believed to be beneficial for particular marketing strategies. Additionally, the present invention provides efficient and unique marketing, purchasing, and sales methods which increase the convenience to both buyers and sellers of good and services. Thus, the present invention effectively combines a product desirable to consumers with an integrated direct marketing feature. Accordingly, it will be apparent that the present invention provides a substantial advance in the art.

BRIEF DESCRIPTION OF THE DRAWINGS

The present invention will be more fully appreciated by a consideration of the following detailed description which should be read in conjunction with the accompanying drawings. In addition, the present invention is illustrated by way of example and not limited by the figures of the accompanying drawings within which like reference numbers indicate similar elements.

DESCRIPTION OF THE PREFERRED EMBODIMENT

The invention is directed to an interactive system and method for providing wallpaper images for a computer desktop of a personal computer. Wallpaper/screen saver images may be conveniently located by a consumer and downloaded for use on the desktop of the consumer's PC. This feature of the invention is described below under the "Basic Wallpaper System Operation" section. Furthermore, sponsors may market their goods or services to the consumers by paying a fee to have their icons or advertisements incorporated into or overlaid on the wallpaper/screen saver images. By clicking on the icons or advertisements, the consumer is automatically connected to a predetermined location on the Internet, such as the sponsor's web site. In addition, a number of web sites may be affiliated with the wallpaper web site, and consumers who subscribe to the wallpaper web site may be able to conveniently purchase products or services from these affiliated sites by merely clicking on one or more pop-up buttons, or the like, once necessary consumer information has been given to the wallpaper web site. These additional features of the invention are described below under the "Marketing Option" section.

System Overview

Figure 1:
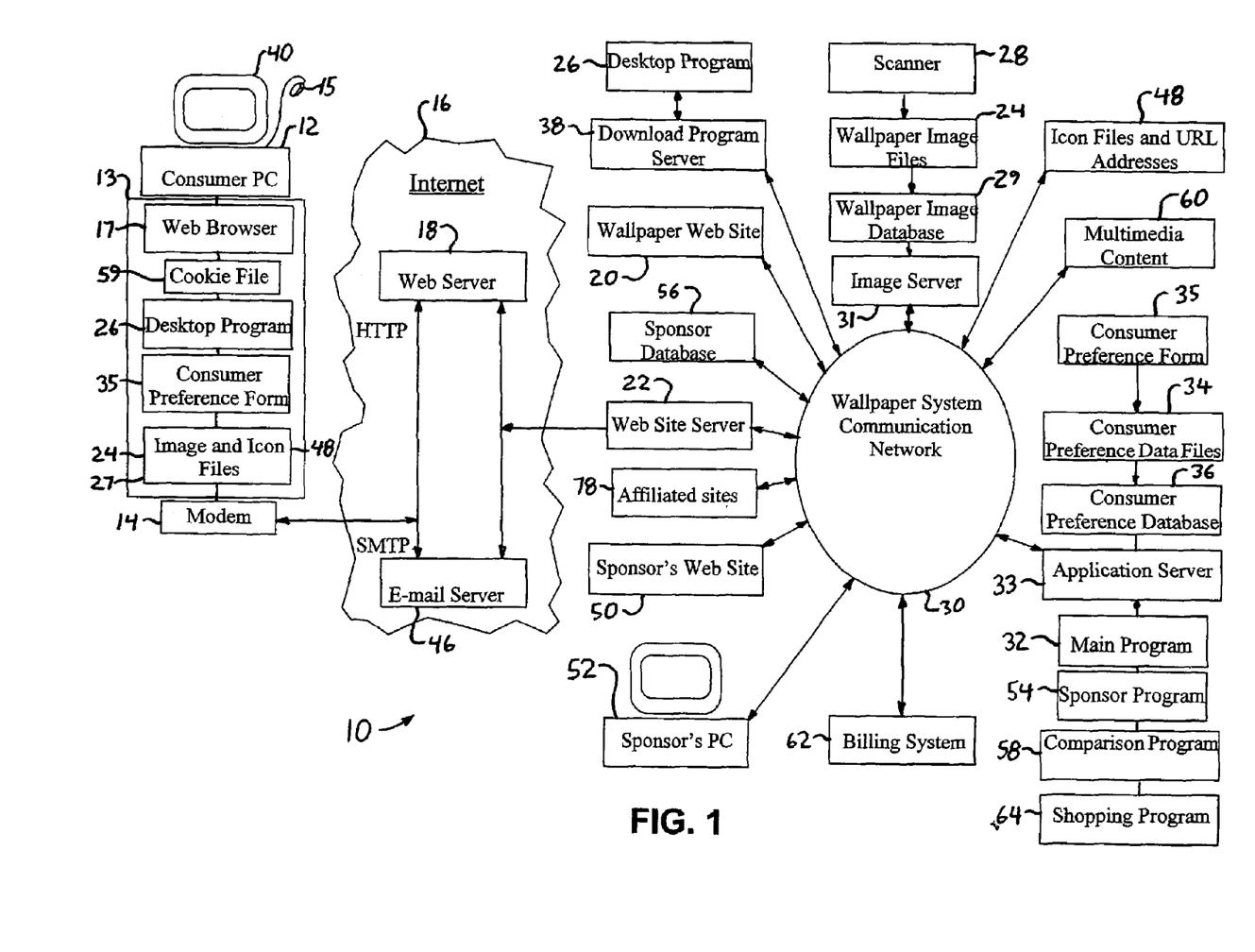
FIG. 1 illustrates the overall system components of the present invention.

FIG. 1 illustrates the overall system configuration 10 of the invention, including various optional features. Under the invention, at least one consumer has at least one consumer's PC 12 which includes a memory 13, such as a hard drive, a modem 14, a mouse 15, and a visual display 40, such as a monitor. Consumer's PC 12 is able to communicate with the Internet 16 via an Internet service provider ("ISP"), or the like, through modem 14 using telephone lines, cable lines, or other telecommunications means. A typical ISP has at least one ISP server 18 and an ISP e-mail server 46 for acting as a communications interface between the consumer and the rest of the Internet 16. Thus, by forming a telecommunication connection between consumer's PC 12 and ISP server 18, the consumer is able to access and communicate with the Internet 16. A web browser software program 17, such as Microsoft's® Internet Explorer®, Netscape® Navigator®, or the like, may then be used to access various hypertext markup language ("HTML") web sites, using a hypertext transfer protocol ("HTTP") from ISP web server 18. Browsing usually incorporates the use of Uniform Resource Locator ("URL") addresses or "links" loaded into browser 17. In general practice, URL addresses may be entered manually into the browser's address bar by the consumer, or may be obtained by using a search engine, or by other means. URL addresses generally indicate location identifiers between the various servers and computers that make up the Internet 16.

Under the system of the invention, a wallpaper system communication network 30 is also provided, and includes at least one wallpaper web site 20 located on a web site server 22, or a similar accessible Internet access site. Wallpaper web site 20 may be accessed by the consumer through ISP server 18 communicating with web site server 22. Wallpaper web site server 22 is in communication with the rest of wallpaper system communication network 30 which, under the present invention, may include at least one, but typically a plurality, of computers and databases able to communicate with each other to facilitate functioning of the invention. Thus, information entered by the consumer at wallpaper web site 20 may be gathered and processed using a main system program 32 loaded on a main application server 33. This main server 33 may, of course, be the same server as web site server 22, or a separate server in communication with web site server 22. Main program 32 oversees functioning of all components of the system, and coordinates between wallpaper web site 20 and the other components.

Web site server 22 is also in communication with a wallpaper image database 29. Wallpaper image database 29 may be retained in the memory of web site server 22, or may be retained on a separate image server 31. A plurality of wallpaper image files 24 are contained in wallpaper image database 29. The image files 24 used as wallpaper images may be jpeg, bitmap, gif, or other suitable image formats. Typically, such image files 24 are created from photographs, original artwork, prints, or the like, using a scanner 28 and a software application, such as Adobe Photoshop®, and then are stored on a hard disk drive for use as wallpaper images. Other image files, such as files created by computer graphic techniques, files already digitally encoded, images from digital cameras, and the like, can also be used to create suitable image files 24. Image files 24 may be categorized according to content, and, in this manner, a large image database 29 of image files 24 suitable for use as wallpaper images may be created.

An application software program (the "wallpaper desktop program 26") which controls and displays the wallpaper images on the consumer's PC desktop is also included with the system of the invention. Wallpaper desktop program 26 may be downloaded by the consumer from web site 20, may come pre-loaded on consumer's PC 12, or may be loaded into memory 13 of consumer's PC 12 from a floppy disk, CD-ROM, or the like. If wallpaper desktop program 26 is to be downloaded by the consumer, this can be accomplished when the consumer accesses wallpaper web site 20 and chooses one or more images files 24 for downloading from wallpaper web site 20. A conventional subroutine at web site server 22 may perform the downloading function, or a separate download server 38 may be used.

Figure 2:
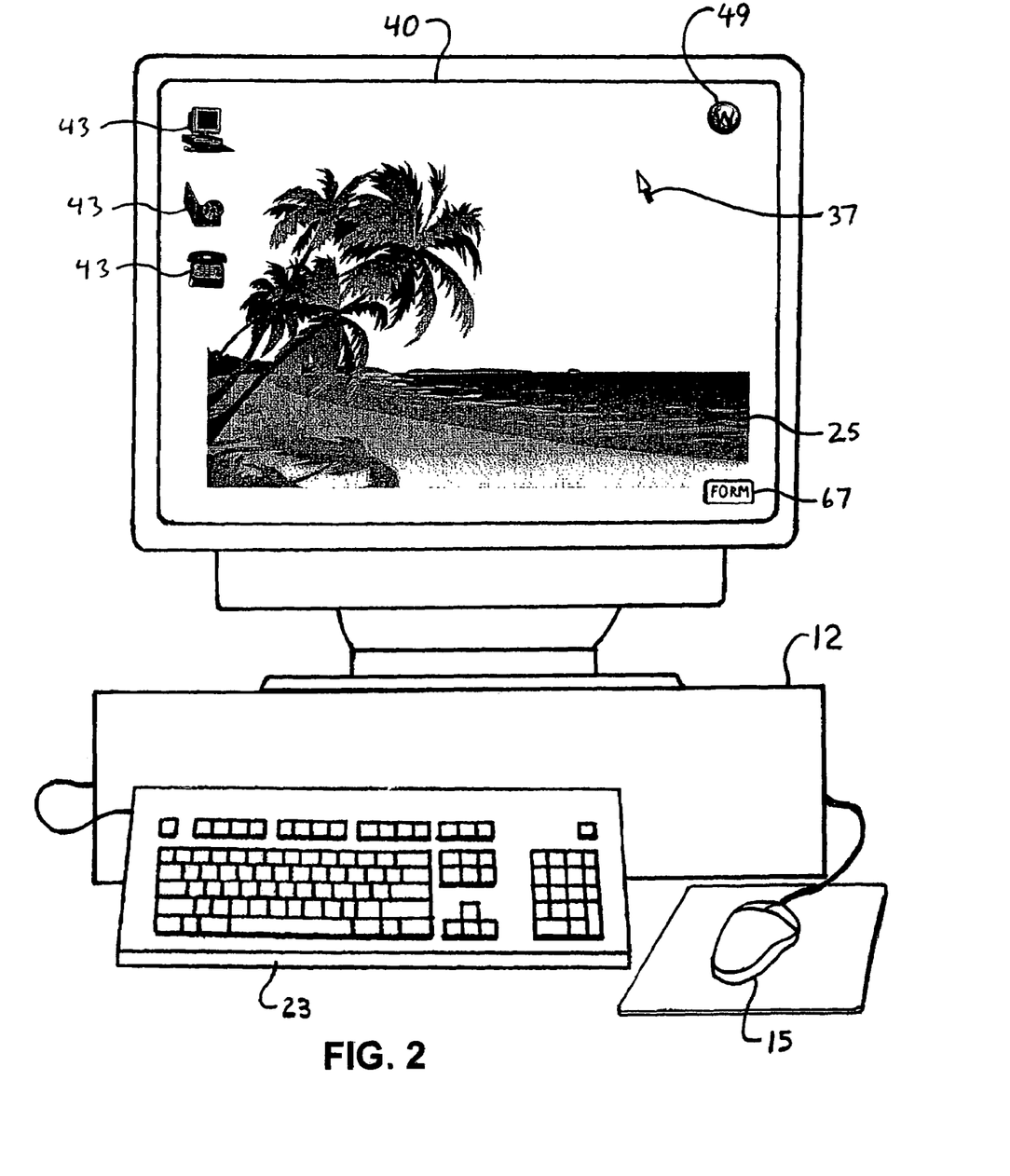
FIG. 2 illustrates the consumer's PC and visual display having a wallpaper image and clickable icon displayed.

As also illustrated in FIG. 2, wallpaper desktop program 26, once loaded on consumer's PC 12, activates (i.e., begins operation) when the consumer turns on consumer's PC 12. At least one image file 24 would normally be supplied with program 26 when it is loaded onto consumer's PC 12. Upon start up, wallpaper desktop program 26 displays an image file 24 as a wallpaper image 25 on visual display 40 of consumer's PC 12 via a standard graphics adapter, or the like. It may be seen that wallpaper image 25 is displayed in the background, and does not obscure the other standard icons 43, tool bars, etc., already present on the computer desktop. If program 26 was pre-loaded on consumer's PC 12, then upon start up for the first time, or at predetermined intervals, the consumer may be prompted to go to wallpaper web site 20 to download new or additional wallpaper images files 24. The prompt may be in the form of a clickable banner, button, or icon which, when clicked upon, causes program 26 to automatically access browser 17 and connect consumer's PC 12 to wallpaper web site 20.

At least one clickable icon file 48 is provided with program 26 or image file 24, and is also displayed by wallpaper desktop program 26 on visual display 40 as a clickable icon 49 overlying or embedded in image 25. As will be described in greater detail below, clickable icon 49 may be clicked-on by the consumer using mouse 15 and cursor 37, or otherwise activated by the consumer, such as by using a keyboard 23 connected to consumer's PC 12. Clicking on clickable icon 49 may automatically connect the consumer to a site for purchasing a hard copy of the image, or may automatically connect the consumer to a sponsor's or advertiser's web site 50. Clickable icons 49 accordingly serve an important role in the marketing feature of the invention.

Wallpaper desktop program 26 also includes an image management feature whereby additional image files 24 can be added to the image files 24 already contained in an image collection 27 on consumer's PC 12. A browse feature is provided with wallpaper desktop program 26, and may be used to locate other image files stored in memory 13 of consumer's PC 12. For example, family photographs or other images may added to the consumer's image collection 27, or the consumer may download image files from other locations on the Internet 16 and add them to image collection 27. Also, wallpaper desktop program 26 may include an auto-minimize feature similar to a screen saver whereby when other applications are left open and unused for a period of time, wallpaper desktop program 26 will, after a predetermined time, minimize those programs so that wallpaper image 25 and clickable icons 49 are visible. Also, clickable icon 49 may be placed in motion and moved across visual display 40 by wallpaper desktop program 26 to various locations on the screen to attract notice. Furthermore, as discussed above, a screen saver program may be incorporated into wallpaper desktop program 26, and a clickable icon 49 may be incorporated into the screen saver image(s) as well.

Under the basic wallpaper downloading and purchasing function of the system of the invention, clickable icon 49 may include a visible text message, such as "click here to purchase a print of this image". If the consumer desires to purchase a hard copy of an image 25, such as a print, poster, painting, or the like, the consumer clicks on clickable icon 49. As is known in the art, the operating system keeps track of the location of mouse cursor 37 on display 40 relative to the location of icon 49, and if mouse 15 is clicked when the respective locations overlap, a signal is delivered to activate wallpaper program 26 which, in turn, starts a sequence of commands to connect consumer's PC 12 to a particular URL address on the Internet. The URL address may be that of wallpaper web site 20, or may be a different site where the consumer is given information, an order form, or the like, regarding purchasing of a print, poster, etc. of the image 25. Alternatively, if clickable icon 49 is that of a sponsor or advertiser, the consumer is connected to a sponsor's web site where information about the sponsor or sponsor's products is displayed to the consumer. Additional functions of wallpaper desktop program 26 and how it interacts with main program 32 will be described below in the Basic Wallpaper System Operation and the Marketing Option Sections.

Main program 32 is a server-side Java or other suitable application program, and controls the functioning of the overall wallpaper system 10. Main program oversees downloading of wallpaper image files 24 to consumer's PC 12 and the initial downloading of wallpaper desktop program 26, if necessary, through the use of a download program or subroutine. Main program 32 also keeps track of consumers who access wallpaper web site 20, and can implant one or more cookie files 59 into consumer's PC 12 for monitoring the consumer's interests, web sites visited by the consumer, or the like. Main program 32 also controls a consumer preference database 36 which can store and monitor consumer preference data files 34 which contain consumer information and consumer preferences on particular subjects, as provided by the consumer, or as derived from cookie file(s) 59. Main program 32 further oversees the storage and distribution of image files 24 for use as wallpaper images, and maintains the wallpaper image database 29 which is accessed by the consumer for downloading particular image files 24 to consumer's PC 12. Main program 32 may also control an interactive marketing feature of the invention whereby sponsors who are interested in advertising to consumers have their company logo, advertisement, icon, multimedia presentation, or the like, downloaded with a wallpaper image and displayed with image 25 on the consumer's desktop as a clickable icon 49. Additional features and functions of main program 32 will be described below in the Basic Wallpaper System Operation and the Marketing Option Sections of the disclosure.

Basic Wallpaper System Operation

The consumer may learn of the availability for downloading of wallpaper image files 24 through advertisements, Internet search engines, or Internet browsing. Alternatively, consumer's PC 12 may come pre-loaded with desktop program 26 when purchased, and, upon activation of consumer's PC 12, a notice of the availability of wallpaper image files 24 is presented to the 20 consumer. If wallpaper desktop program 26 is not pre-loaded on consumer's PC 12, it can be downloaded to consumer's PC 12 along with one or more image files 24 the first time that the consumer downloads image files 24 from wallpaper web site 20. Accordingly, the consumer uses browser 17 to accesses wallpaper web site 20 to view image files 24 to use as wallpaper on their computer desktops. This step is illustrated as step 110 in the flowchart shown in FIG. 3.

Figure 3:
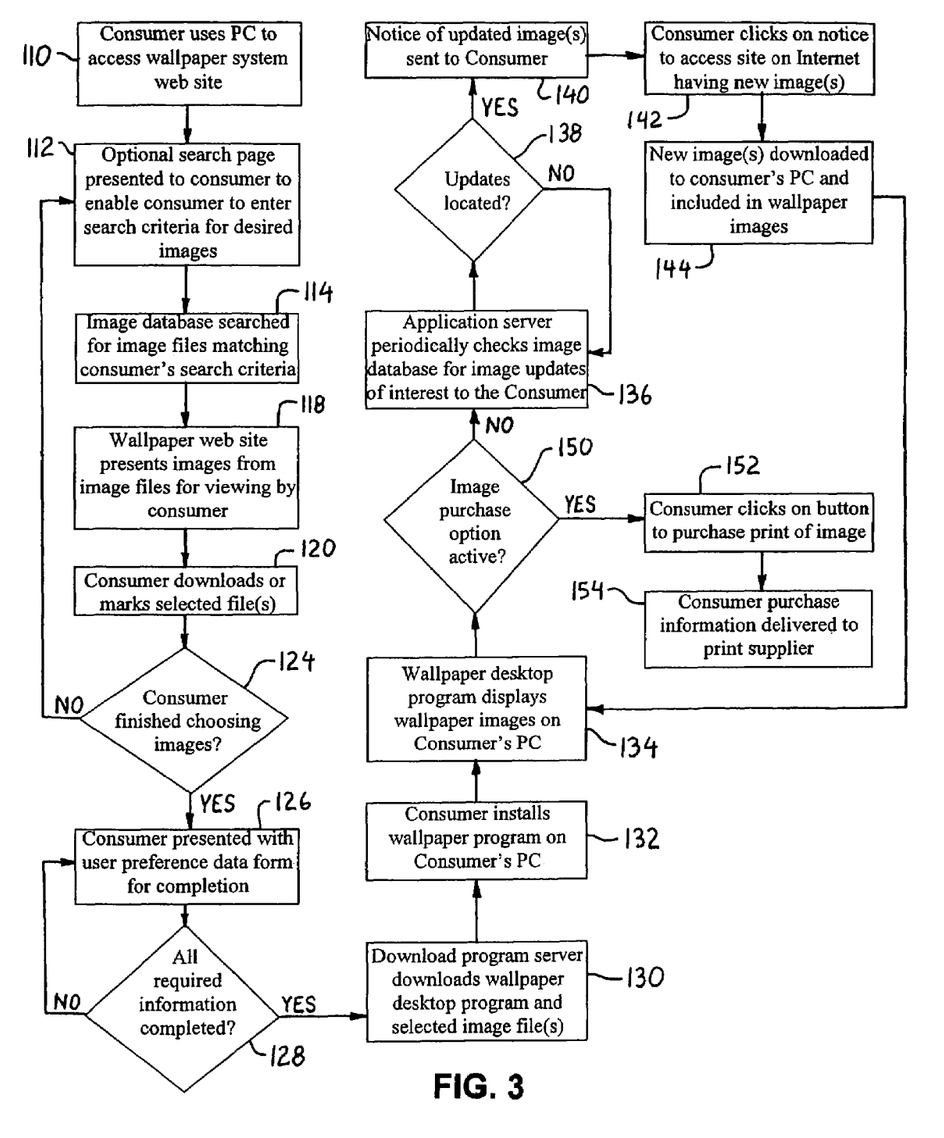
FIG. 3 illustrates a flowchart which sets forth the function of the basic wallpaper system of the invention.

After accessing the wallpaper web site 20, the consumer selects one or more of the image files 24 presented. Image files 24 may be presented from a predetermined set of images, and the consumer may choose from these images. Optionally, the web site 20 may prompt the consumer to enter a search criteria, such as keywords, into a search field space displayed on a web page at Web site 20 (step 112). The image database 29 is then searched for image files 24 which match the consumer's criteria. For example, if a consumer is interested in horses, he or she may enter the keyword "horses" in order to locate images containing horses. The search criteria is interpreted into SQL commands through a CGI script application on the web site server 22. The SQL commands are then used by the image database 29 to identify wallpaper image files 24 that match the search criteria (step 114). The CGI script may be written in a software scripting language, such as JavaScript®, or VB Script. The image database 29 may be a relational database management system, such as Oracle 7 or Microsoft® SQL Server 7. The image database 29 locates one or more wallpaper image files 24 which match the search criteria, and presents the image files 24 to the consumer at the wallpaper web site 20 (step 118). By clicking with a mouse on either the resulting images or URL's, the consumer can view and mark for downloading any one or more of the located image files 24 (step 120). If the consumer does not locate any desired images, or would like to locate additional images, the consumer may conduct additional searching until a desired number of image files 24 have been marked for downloading. Alternatively, if the search criteria option is not implemented, steps 112 and 114 are skipped, and the consumer selects one or more images from the image files 24 presented (steps 118, 120).

Once the consumer has selected one or more desired image files 24, the consumer indicates that he or she is finished and ready to download the selected image files 24 (step 124). However, as an option, prior to being allowed to download the selected image files, the consumer is prompted via an HTML web page at web site 20 to submit consumer preference data 34, such as name, residential address, e-mail address, key dates (such as family birthdays, anniversaries, etc.), buying habits, hobbies, and any desired additional information deemed useful for marketing purposes (step 126). A consumer preference form 35 is presented to the consumer and has standard lines to be filled out. A version of this form 35 may also be downloaded to the consumer's desktop with desktop program 26 for filling out offline by the consumer. Also, as will be described below, preference form 35 may inquire as to additional information that may be of particular use for marketing and purchasing of products. Response to some or all of the information queries may be mandatory (i.e., credit card numbers, mailing addresses, etc.) before the consumer is able to download the selected image files 24, or be compatible to shop at affiliate sites, as will be described below.

A CGI script on web site server 22 enters the consumer preference data 34 into a consumer preference database 36. If applicable, the most recent consumer search criteria (e.g., "horses") may be entered as well. Once the consumer preference data form has been completed (step 128), the selected image files 24 may be downloaded to the consumer's personal computer 12. If necessary, desktop software program 26 is also downloaded with images files 24 from a download program server 38 via an HTTP connection, a file transfer protocol ("FTP") connection, or other suitable connection (step 130). After the consumer installs wallpaper desktop program 26, desktop program 26 will display the downloaded images as wallpaper on the consumer's PC 12. Wallpaper desktop program 26 may be installed by the consumer by using the computer mouse 15 to click on an icon (not shown) that is displayed on the consumer's PC desktop (step 132), and by then following installation instructions. The desktop program 26 may be written in Java, C++, or other suitable formats, and, once the program is activated by the consumer, desktop program 26 installs itself on the consumer's PC 12 and initiates the display of the selected wallpaper image files 24 as wallpaper images 25 (step 134).

Also, one or more cookie files 59 may be downloaded with wallpaper desktop program 26 or at other times when the consumer accesses wallpaper web site 20. A cookie file 59 may perform a number of functions, as will be described in greater detail below. One particular function which cookie file 59 may serve is to track the consumer's movements when logged on to the Internet. Thus, cookie file 59 may keep a record of each site which a consumer visits, and then communicate this information to consumer preference database 36, through main program 32. This enables the information recently gathered by cookie file 59 to be added to the existing consumer preference data 34. This information may then serve as an alternate or additional means for determining which wallpaper images may be of interest to a particular consumer. The cookie file information may also be used with the marketing features of the invention, as set forth below.

In addition, information from cookie file 59 may be used to ask questions of the consumer. For example, a record of past downloads may be used to ask if the consumer is interested in buying items advertised at sites the consumer has visited, or ask whether the consumer is interested in new image files 24 for use as wallpaper, or the like. Preferably, a different set of questions would be asked of the consumer each time. Also, if the consumer deletes cookie file 59, the consumer's e-mail address may be matched to the consumer preference data 34 and cookie file 59 may be reinstated at the point at which it was deleted.

Wallpaper desktop program 26 may also include a variety of conventional features. For example, wallpaper desktop program 26 may allow the consumer to select a plurality of the downloaded wallpaper image files 24 to be displayed sequentially as wallpaper images 25 on visual display 40. Image files 24 may be cycled on an hourly, daily, or other user-specified basis. Desktop program 26 is configured to start running upon startup of the consumer's operating system and displays the wallpaper image files 24 as configured. The program is also able to accommodate the addition of new image files 24 to the image file collection 27 already in use on the consumer's PC.

In addition to overseeing the downloading of the initial image files 24, wallpaper system main program 32 also has the capability of notifying the consumer that new or additional image files 24 are available. This may be done on a regular periodic basis, or may be done as new image files 24 which match the consumer's search criteria are added to image database 29. For example, main program 32 may send a notice to the consumer that one or more selected new wallpaper image files 24 are available to be downloaded. The image files 24 selected by main program 32 may be based upon the types of images previously downloaded by the consumer. For example, if the consumer had previously downloaded images of paintings by French impressionists, main program 32 may periodically check for image files 24 of other French impressionist paintings (step 136). When a suitable image file 24 is located (step 138), a notice of a new image may be sent to the consumer (step 140). In addition, information gathered by cookie file 59 regarding the sites on the Internet 16 visited by the consumer may also be used to determine which image files 24 may be of interest to a consumer. Additionally or alternatively, notices of new image files 24 may be sent to the consumer on a regular basis, such as one or more new image files 24 per week. In this manner, the consumer's wallpaper/screen saver image collection 27 may be constantly changed or updated.

Still alternatively, if the consumer search criteria option was used (steps 112, 114), as new image files 24 are added to the wallpaper image database 29, main program 32 on application server 33 keeps track of the image file updates and continually checks consumer preference database 34 for a match based upon the consumer's previously entered search criteria (step 136). As matches are found (step 138), a notice that one or more new image files 24 are available for downloading may be delivered to the consumer (step 140). The notice tells the consumer that one or more new image files 24 are available, and provides a URL link for the consumer to click on to access a location on the Internet 16 where the new image file 24 may be viewed. The consumer is then able to download the new image files 24, and add them to those image files 24 already being displayed as wallpaper on consumer's PC 12.

The notice of new image files 24 may be delivered in a number of ways, such as through an e-mail message. For example, the notice may be e-mailed directly to the consumer via e-mail server 46 using the conventional SMTP protocol. The e-mail message contains a URL link for the location of the new image file. The e-mail message is read by the consumer using an e-mail application on the consumer's PC 12, such as Microsoft Exchange. By clicking on the URL link contained in the notice, the consumer is automatically connected to the site on the Internet 16 which contains the new image file(s) 24 (step 142). If the consumer wants to add the new image file(s) 24 to his or her wallpaper, the consumer downloads the new image file(s) 24 via HTTP, FTP, or the like (step 144), as described above with respect to the initial download of images. Any updates to desktop program 26 may also be downloaded at this time by download program server 38 or main program 32 via HTTP, FTP or the like. The consumer runs desktop program 26 to add the new image file(s) 24 to the existing wallpaper/screen saver sequence, or, of course, the new image file(s) 24 may replace one or more of the existing wallpaper image files 24 the consumer has been using.

As an alternative to the use of e-mail to deliver the notice, the notice may be delivered to the consumer the next time the consumer accesses the Internet 16 by loading a clickable icon 49 or button on the wallpaper on the consumer's desktop through the use of cookie file 59. Clickable icon file 48 contains a reference address to the URL link for the new image file(s) 24. By clicking on clickable icon 49, consumer's PC 12 is connected to the site on the Internet 16 which contains the new image file(s) 24, and new image file(s) 24 may be viewed and downloaded as described above. A pop-up window, or other device on the consumer's web browser, such as Frames technology, could also serve the same purpose as button or clickable icon 49.

Still alternatively, if the consumer has a personalized "front page" associated with an Internet host, such as the Excite® or Yahoo® front page, a notice may be placed on the consumer's personalized front page. The notice may be in the form of a button, icon, banner, text link, window, or other device that appears on the front page when the consumer logs on the Internet 16. As above, the button contains the URL link for the new image file(s) 24, and the consumer is connected to the site containing the image file(s) 24 by clicking on the button, icon, etc.

Accordingly, the Wallpaper portion of the present invention provides a novel method and system for supplying desirable wallpaper images to consumers. Consumers are able to obtain wallpaper images in accordance with their personal tastes and interests in a convenient and advantageous fashion. Consumers are additionally provided with an option to conveniently purchase a hard copy of an image. The consumers may also be charged a fee for wallpaper image files 24, but alternatively, sponsors may pay a fee to have advertisements, clickable icons, or the like, included with wallpaper image files 24 downloaded by the consumers. This additional feature of the invention is described below in the "Marketing Option" portion of the disclosure.

Marketing Option

The custom wallpaper system described above may be modified to include a marketing or advertising aspect for marketing goods or services to consumers, whereby sponsors will pay a fee to the wallpaper system operator. In return, the sponsor's company logo, icon, or an advertisement will be embedded in, or overlaid onto, wallpaper images 25 as a clickable icon 49. Clickable icon 49 may include a logo, icon, advertisement, banner, window, or the like, present on display 40, which, when clicked on using mouse 15, or otherwise activated by the consumer, sends a signal to wallpaper desktop program 26 to connect consumer's PC 12 to a predetermined location on the Internet 16. Clickable icon files 48 may be transmitted to the consumer with wallpaper image files 24, or may be loaded onto the background of the consumer's PC by downloading a clickable icon file 48 to wallpaper desktop program 26 when the consumer is on the Internet 16, or the next time the consumer logs on to the Internet and cookie file 59 signals such to main program 32. Clickable icons or advertisements 49 include URL address links for automatically connecting consumer's PC 12 to a predetermined location on the Internet, such as to sponsor's web site 50. Optionally, clickable icon files 48 may be included only with image files 24 sent to certain consumers, based upon the consumer preference data 34 which the consumer provided in step 126 of the flowchart of FIG. 3. Thus, the invention also enables sponsors, at their discretion, to identify particular consumers who are more likely to be interested in the sponsor's goods or services.

Figure 4:
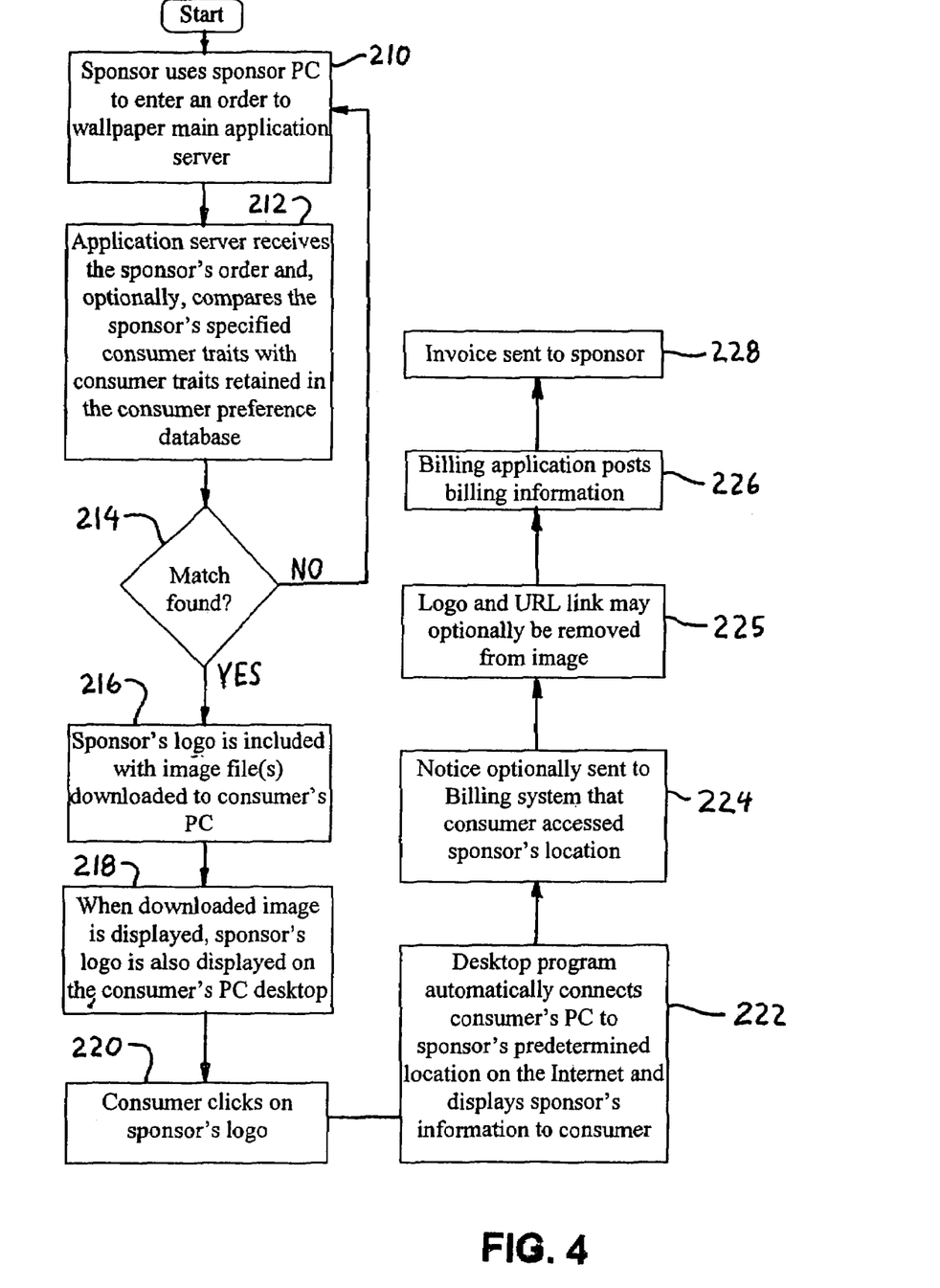
FIG. 4 illustrates a flowchart which sets forth an optional marketing portion of the invention.

As illustrated in the flowchart of FIG. 4, using sponsor PC 52, the sponsor's orders are sent to the Main Program Application Server 33 and entered (step 210). Each order contains a rate, URL address of the link, the start and finish dates, target consumer preferences (if this option is desired), a static or animated clickable icon file 48, and billing information. A sponsor application program 54 on the main program application server 33 is a client-server application which may be written in Java or other suitable programing language and is in communication with main program 32. A subroutine of main program 32 enters the sponsor's order data into a sponsor database via a JDBC interface or the like. The client-side application is a graphical user interface for entering, viewing, and checking the data.

If only those consumers having one or more particular favorable traits are desired by the sponsor, a comparison program 58 or subroutine on main program application server 33 compares sponsor order data in the sponsor database 56 with consumer preference data 34 from the consumer preference database 36 (step 212). Any matches between a particular consumer preference trait and a trait desired by the sponsor are noted by comparison program 58 (step 214). Comparison program 58 may be run each time one or more image files 24 are to be downloaded to a consumer. Thus, a matching trait may be noted the first time a consumer fills out consumer preference form 35, or may be noted some time later when notices of new image files 24 are to be e-mailed to the consumer.

Accordingly, a clickable icon 49 may be embedded or overlaid on images 25 of the first image files 24 downloaded to the consumer, may be embedded or overlaid in subsequently downloaded new image files 24, or both. Of course, a sponsor may desire instead to have its clickable icon 49 included in all images files 24 downloaded to all consumers, for example, over a designated period of time or the like, without reference to particular consumer traits. Alternatively, main program 32 may keep track of the image files 24 downloaded by consumers, and may match sponsors to consumers based upon the type of images downloaded. Still alternatively, sponsors may be matched to consumers based upon sites the consumer visits on the Internet 16, by tracking the consumer's movements with cookie file 59. Also, as will be described in more detail below, sponsors may be matched to consumers based upon a consumers expression of a desire to purchase a particular product.

Accordingly, whether or not optional steps 212 and 214 are included, once a sponsor's order has been received and processed, then, when consumers download wallpaper image files 24 (either first time, or new image files), clickable icon 49 with a URL link is embedded or overlaid on one or more displayed images 25 (step 216). Thus, when wallpaper image files 24 are displayed on the consumer PC 12 desktop by wallpaper desktop program 26, the wallpaper image 25 includes clickable icon or advertisement 49 visible on a portion of the image (step 218).

Clickable icon files 48 are embedded or overlaid objects managed by wallpaper desktop program 26. Icons 49 may be static or animated, and may be displayed temporarily or permanently. A particular clickable icon 49 may be alternated with other clickable icons 49 and URL links, thereby rotating between multiple sponsors. Also, a combination of both embedded icons 49 and overlaid icons 49 may be used with a single image. For example, a primary sponsor's icon 49 may be embedded in a particular image 25, and a secondary sponsors's icon 49 may be overlaid on another portion of the image. In this manner, the secondary sponsor's icon 49 may be changed on a daily, weekly, monthly, or other basis, while the primary sponsor's icon 49 remains embedded in image or images 25. In an embedded clickable icon file 48, the file code is part of the code of a particular image file 24, and thus, an embedded clickable icon 49 loads with the image file 24 in which it is embedded. In an overlaid clickable icon file 48, on the other hand, the file code is separate from the code of any particular image file 24, and an overlaid clickable icon 49 is displayed by wallpaper program 26 independently of any particular wallpaper image 25.

Clickable icon files 48 may be Active X controls, Java Applets, or other suitable applications that may have start and end times, or other control parameters built in, as well as their animation characteristics and URL links. Also, icon files 48 may be downloaded to consumer's PC 12 anytime the consumer connects to the Internet 16, with or without the consumer's consent, and is displayed by wallpaper desktop program 26. For example, cookie file 59 installed on consumer's PC 12 by the web site server 22 may help main program 32 to determine if a download is appropriate. Thus, it is easy to change sponsors on regular basis, with wallpaper desktop program 26 controlling the placement of clickable icons 49 on the consumer's wallpaper. Also, a sponsor may merely change the URL address that a clickable icon 49 links to when clicked upon by downloading a new URL address to the icon file 48. In addition, clickable icons 49 may be animated or may move about the screen to attract attention of the consumer.

When the consumer is using his or her PC 12, by clicking on the displayed icon 49 (step 220), the consumer is automatically connected to a predetermined location on the Internet, such as the sponsor's web site 50. The predetermined location may be, for example, an HTML page at the URL address specified by the sponsor in clickable icon file 48 (step 222). This connecting function is performed by the desktop program 26, which accesses the consumer's modem 14 and web browser 17 for connecting the consumer's PC 12 to the URL address specified by the sponsor. Alternatively, or additionally, sponsors may choose to distribute multimedia files 60, such as audio and video files, rather than URL links and clickable icon files 48.

Once the consumer has been connected to the sponsor's web site 50, the consumer may view advertising displays, view product or service information, purchase products or services, or the like. After the finished data passes, the clickable icon 49 and URL object may optionally be deactivated or removed from the image file 24 by wallpaper desktop program 26 (step 224). An indication of this occurrence may then be sent to main application server 33 by cookie file 59 or other suitable means. Billing information is posted to a billing application on a billing system 62 (step 226), which sends the sponsor an invoice (step 228). Alternatively, of course, the sponsor may pay a predetermined fee for receiving the service for a specified period of time of the like.

In a related aspect or feature, as illustrated in FIG. 3, an option may be included in the wallpaper main program 32 (step 150) which enables the consumer to order a hard copy of a wallpaper image (i.e., the image itself) in a different format, such as a painting, print, poster, or the like. For example, if the consumer has downloaded one or more wallpaper images of French impressionist paintings, and if the consumer desires a print of one the images, the consumer may click on a clickable icon 49 embedded or overlaid on the image (Step 152). This may open a pop-up window which automatically connects the consumer to a web site on the Internet 16 for purchasing a print of the image. The site may be wallpaper web site 20, or may be a separate Internet location. Alternatively, the order may be placed the next time the consumer logs onto the Internet 16. The order is directed to the print supplier (Step 154) who ships the print to the address supplied by the consumer and applies charges to the consumer's credit card. This method may be applied to the purchase of other products as well, as will be described in more detail below.

Under an additional feature of the invention, advertisements for the wallpaper web site 20 may be placed at a plurality of various sponsor web sites 50. When a consumer accesses one of these sponsor web sites 50 and clicks on the advertisement for wallpaper web site 20, the consumer is connected to wallpaper web site 20. Main program 32 may make a note of this, and automatically include that particular sponsor's clickable icon 49 with any image files 24 downloaded by that particular consumer. For example, if a consumer is at sponsor A's web site 50, notices an advertisement for wallpaper web site 20, and clicks on the advertisement to access wallpaper web site 20, sponsor A's clickable icon 49 may be automatically included with any image files 24 downloaded to that consumer.

Also, optionally, an additional consumer preferences icon or button 67 may be included with wallpaper desktop program 26 when downloaded to the consumer, and this button 67 may be used by the consumer for displaying consumer preferences form 35 offline. Button 67 may be overlaid on a wallpaper image, embedded in the image, may be located on the operating system tool bar, or in other suitable locations on the consumer's PC and/or desktop. When clicked-on or otherwise selected by the consumer, button 67 may present consumer preferences form 35 for filling out consumer preference information. Consumer preferences form 35 has standard lines to be filled out by the consumer, and may ask for a variety of information. Thus, the consumer may fill out consumer preferences form 35 offline in addition to, or instead of, providing the information online at wallpaper web site 20. Wallpaper desktop program 26 and cookie file 59 can then transmit the consumer's preference data 34 to main server 33 for use as detailed above, and thus, the consumer's preference data 34 may be continually updated as the consumer changes it on form 35. The consumer is able to access form 35 at any time, review the information contained therein, and update the information as necessary. For example, if the consumer changes the credit card number in use on form 35, this updated information is transmitted to the consumer preference database 36 the next time the consumer logs on to the Internet. Wallpaper desktop program 26 may also use the information to provide reminders to the consumer for important dates, such as birthdays or anniversaries, or may be use the information for proactive marketing, as described below and as illustrated by the flowchart of FIG. 5.

Furthermore, consumer preferences form 35 can be user-specific. For example if several different consumers all share a single consumer's PC 12, then each consumer may have his or her own consumer preference form 35 for maintaining separate consumer data profiles. A password access requirement, the use of personalized front page at log on, or the like, may be provided or used for protecting the information contained in the forms 35 and for recognizing which user is using consumer's PC 12. This way, each consumer may receive only the product information in which they are interested. Also, the desktop program 26 may recognize which user is using consumer's PC 12, and may display particular wallpaper images 25, sponsor icons 49, or product information which interests that particular user.

Figure 5:
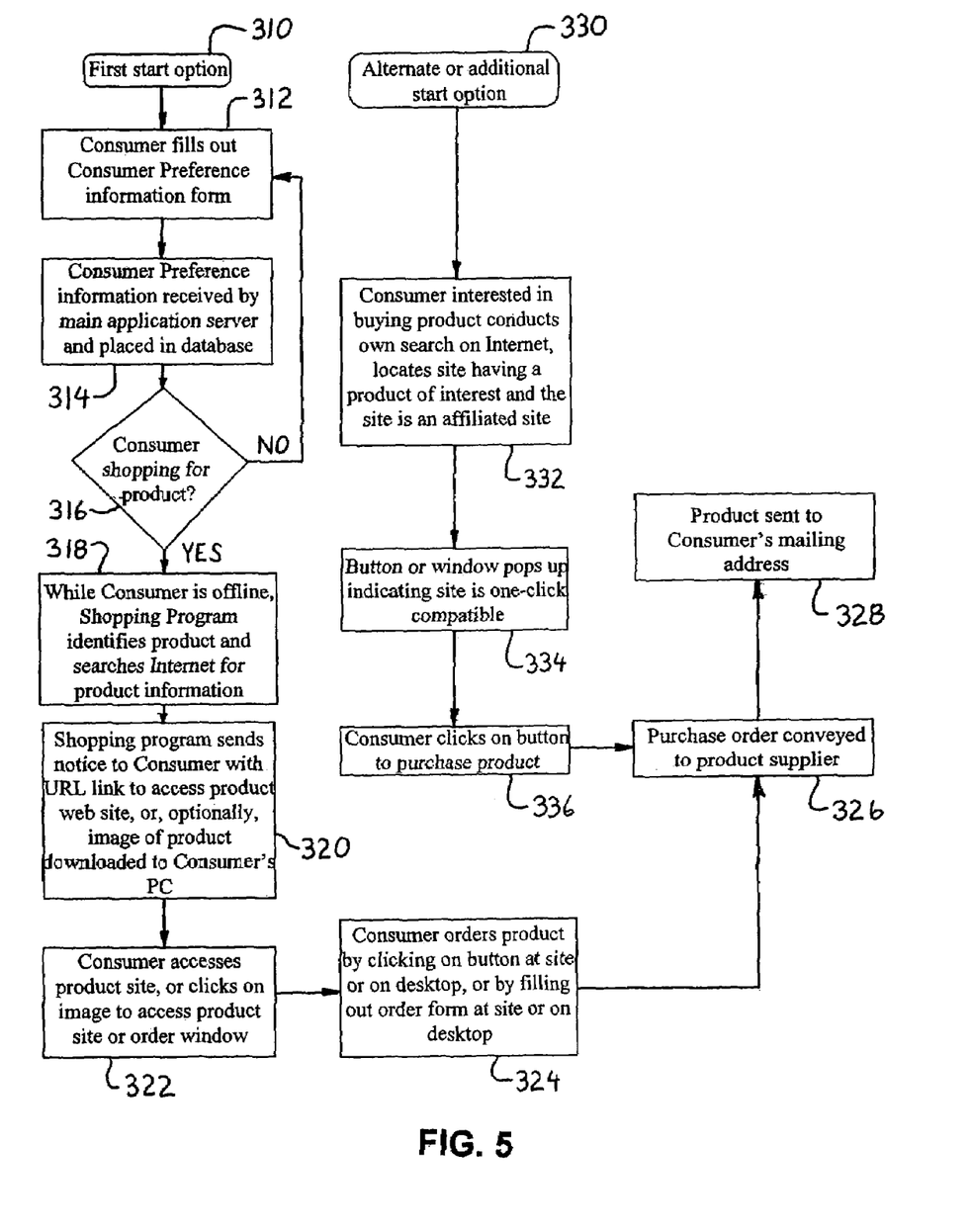
FIG. 5 illustrates a flowchart which sets forth additional optional aspects of the marketing method of the invention.

Additionally, as illustrated in FIG. 5, under a first proactive marketing option (step 310), consumer preference data form 35 can also ask whether the consumer is currently in the market for any particular products, and, if not previously supplied, request the consumer's credit card information, home mailing address, and other information necessary for purchasing products (step 312). The information is then transmitted to main application server 33, as described above (step 314) and retained in consumer preference database 36. If the consumer indicates he or she is currently shopping for a particular product (step 316), wallpaper desktop program 26 can communicate this information to main program 32, either by an auto dial-up feature, or via cookie 59 the next time the consumer logs on to the Internet. Main program 32 will then use a shopping program 64 or subroutine to access the Internet 16 and locate the product in which the consumer has expressed an interest (step 318). Alternatively to Shopping Program 64, a human employee of the wallpaper service operator may perform the same shopping function as shopping program 64, and employees may be employed who are experts in shopping for particular types of products on the Internet 16. URL links are then provided to the consumer in notices (step 320), as described above, for connecting the consumer to web sites where the products the consumer is seeking are for sale. Thus, these notices may be provided by e-mail, or may be provided the next time the consumer logs on to the Internet 16. For example, if the consumer is currently shopping for luggage, the consumer enters this information into the appropriate location on the consumer preference form. This information is communicated to main program 32 and shopping program 64. Shopping program 64 seeks out sites on the Internet 16 which sell luggage, and sends a notice to the consumer along with the URL links for the luggage sites located. The consumer can then click on the notice or link to access the product site (step 322). This can save the consumer considerable time since the consumer will not have to manually search the Internet for products.

As an additional feature, rather than merely providing the consumer with a notice when the product is located, an image or advertisement for the product may be loaded directly into the consumer's desktop as a wallpaper image 25, window, or the like. For example, if the consumer is seeking to purchase luggage, a wallpaper image 25 of the luggage requested may be loaded into the consumer's desktop in same manner as described above with respect to image files 24. The product image 25 may contain product specifications, pricing, and other advertising information, and, if the consumer decides to purchase the product, the consumer may click on a portion of the image while offline to purchase the product. This may involve clicking on a clickable icon 49 that provides an automatic dial-up to the Internet, and which connects the consumer directly to the site for purchasing the product, as described above with respect to the purchasing of a hard copy of an image. Alternatively, a purchase order form window may come up on the consumer's desktop for the consumer to fill out offline. Once the purchase form is filled out offline, the order is sent by cookie file 59 the next time that the consumer connects to the Internet 16. Still alternatively, if the consumer has previously filled out consumer preference data form 35 along with credit card information, mailing address, or other necessary information, then the consumer may make and confirm a purchase order merely by clicking on one or more pop-up buttons either on the PC desktop, or at the product web site (step 324), as will be described in more detail below. The purchase order is conveyed to the product supplier (step 326), and the product is mailed to the address specified by the consumer (step 328).

In an alternative or additional related aspect of the invention (step 330), a number of affiliated sites 78 for various products may be affiliated with the wallpaper main server 33 and the wallpaper system operator. These affiliated sites 78 may be "one-click compatible" with consumers who have subscribed to wallpaper web site 20. Thus, once a consumer fills out consumer preference form 35, the consumer can purchase products from any number of affiliated sites 78 by simply clicking one or more buttons at those sites 78.

For example, the consumer fills out the required information on consumer preference form 35 (e.g., credit card information, mailing address, etc.) and this information is transmitted to consumer preference database 36. The consumer may supply this information as described above, either during a visit to the wallpaper web site 20, or offline on the consumer PC 12 desktop by clicking on the consumer preference form icon 67 on the wallpaper images, the operating system tool bar, etc. Once the required consumer information is in the consumer preference database 36, and when the consumer accesses an affiliated web site 78 while shopping on the Internet (step 332) (preferably by clicking in through the wallpaper desktop program 26, or, alternatively, by using a web browser), then a button, window, or other notice may pop up at the affiliated site 78 to notify the consumer that the affiliated site 78 is "one-click compatible" (step 334). This means that the consumer may purchase products by merely clicking on the button (e.g., a "buy this product" button), and does not have to fill out additional forms to supply credit card information, mailing address, or the like, every time a purchase is made. This information is automatically transmitted to the affiliated site 78 by wallpaper main server 33 or cookie file 59. Accordingly, by clicking on one or more buttons, the consumer may purchase a product (step 336), the purchase information is conveyed to the product supplier (step 326), and the product is mailed to the address specified by the consumer (step 328). Thus, this service is both time saving and convenient.

The consumer may be given the option as to whether he or she wants the one-click compatible option to be activated on the consumer's PC. Thus, if the consumer does not want this service, it may be possible to turn off this feature. This service may be controlled using cookie program 59 which tracks the consumer's travels on the Internet. Cookie file 59 can send information to affiliated web sites 78 when the consumer visits the affiliated web sites 78 on the Internet. Cookie file 59 retains or accesses the consumer's information from the consumer preference form, and can transfer this information to affiliated web sites 78 as an ASCII file or the like. This also initiates the one-click-compatible button or window to pop up on the web page at the affiliated web site 78, thereby notifying the consumer that the site is one-click compatible.

In an additional aspect, the desktop program may also include a screen saver feature. Screen savers generally erase all or a portion of a screen to prevent damage to the monitor's cathode ray tube, or alternate through a series of images. The screen saver of the present invention may include a clickable icon 49 which starts moving over display 40 of the consumer's PC 12 after a predetermined time has passed, and may progressively blackout or refresh the screen. The icons for the screen saver may be from the same sponsors present on the wallpaper images, or may rotate based upon predetermined parameters and may be from different sponsors. The consumer can also select the use of wallpaper image files 24 as the screen saver, whereby the screen saver displays a slide show of several or more of the wallpaper image files, and the image files may include the clickable icons displayed with them. In addition, the screen saver may comprise a combination of both the wallpaper images and the animated or moving sponsor icons.

From the foregoing description, it will be apparent that the present invention sets forth a new and useful way for consumers to obtain desirable wallpaper images for use on their computer desktops. Furthermore, the invention provides a useful marketing, sales, and purchasing tool for sponsor's seeking to distribute their goods and services to consumers. Thus, while preferred embodiments have been described herein, it will be recognized that a variety of changes and modifications may be made without departing from the spirit of the subject invention.

What is claimed is:

1. A method for providing a hard copy of an image to a user of a personal computer, said method comprising:

providing a wallpaper desktop program operational on the personal computer for displaying one or more wallpaper images on the visual display;

placing a wallpaper image file in the memory of the personal computer, said wallpaper image file displayable as a wallpaper image on the visual display by said wallpaper desktop program;

placing at least one clickable icon file into the memory of the personal computer, said clickable icon file displayable as a clickable icon on the visual display by said wallpaper desktop program;

displaying said wallpaper image on the visual display; and displaying said clickable icon with said wallpaper image, whereby, if said clickable icon is selected by the user, said desktop program causes the personal computer to access a web site on the Internet where the user can purchase a hard copy of said wallpaper image.

2. The method of claim 1 further including the step of providing a wallpaper web site through which the user may view said wallpaper image prior to placing said wallpaper image file into the memory of the personal computer.

3. The method of claim 1 further including the step of periodically transmitting to the personal computer a notice that additional wallpaper images are available for downloading to the user's personal computer.

4. The method of claim 2 further including the step of providing a user preference form at said wallpaper web site, and requiring the user to provide information to said form prior to placing said wallpaper image file into the memory of the personal computer.

5. The method of claim 4 further including the step of using the information from said form to determine additional wallpaper images of interest to the user and for periodically transmitting to the personal computer a notice that said additional wallpaper images are available for downloading to the memory.

* * * * *